US012688288B2

(12) United States Patent
Cheng et al.

(10) Patent No.: US 12,688,288 B2
(45) Date of Patent: Jul. 21, 2026

(54) DETECTING A MALICIOUS CLOUD TENANT USING SPATIALIZED ACTIVITY DATA

(71) Applicant: Microsoft Technology Licensing, LLC, Redmond, WA (US)

(72) Inventors: Beibei Cheng, Bellevue, WA (US); Michael Vincent Mclaughlin, Seattle, WA (US); Tannu Jiwnani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 18/967,225

(22) Filed: Dec. 3, 2024

(65) Prior Publication Data

US 2026/0154406 A1 Jun. 4, 2026

(51) Int. Cl.
G06F 21/56 (2013.01)
G06N 20/00 (2019.01)

(52) U.S. Cl.
CPC ............. G06F 21/56 (2013.01); G06N 20/00 (2019.01); G06F 2221/034 (2013.01)

(58) Field of Classification Search
CPC ........................... G06F 21/56; G06F 2221/034
See application file for complete search history.

(56) References Cited

U.S. PATENT DOCUMENTS

| | | | | |
|---|---|---|---|---|
| 11,463,472 | B2 * | 10/2022 | Chen | G06F 21/568 |
| 11,711,383 | B2 * | 7/2023 | Deardorff | H04L 63/1416 |
| | | | | 726/23 |
| 11,790,083 | B2 * | 10/2023 | Disney | G06F 21/568 |
| | | | | 726/24 |
| 12,113,808 | B2 * | 10/2024 | Costea | G06F 21/554 |
| 12,124,564 | B2 * | 10/2024 | Venkataraman | G06F 21/56 |
| 12,166,776 | B1 * | 12/2024 | Pierce, Jr. | H04L 63/0281 |
| 12,273,380 | B2 * | 4/2025 | Finkelshtein | H04L 63/166 |
| 12,367,278 | B2 * | 7/2025 | Lisowski | H04L 63/1416 |
| 12,476,990 | B2 * | 11/2025 | Shachar | H04L 63/1425 |
| 12,556,574 | B2 * | 2/2026 | Edry | H04L 63/1416 |
| 2021/0042413 | A1 * | 2/2021 | Oetken | G06F 21/567 |
| 2021/0120022 | A1 * | 4/2021 | Kaderábek | H04L 63/101 |
| 2021/0314349 | A1 * | 10/2021 | Liu | G06N 20/00 |
| 2022/0269784 | A1 * | 8/2022 | Oetken | G06F 21/562 |
| 2023/0208858 | A1 * | 6/2023 | Mishra | H04L 63/1416 |
| | | | | 726/23 |

* cited by examiner

*Primary Examiner* — Viral S Lakhia
(74) *Attorney, Agent, or Firm* — Workman Nydegger

(57) ABSTRACT

Methods and systems for identifying malicious tenants using machine learning (ML) models and spatialized activity data within a cloud platform. A method includes accessing sequential activity data for a tenant, converting the sequential data into spatial data by creating multi-dimensional representation(s) expressing the sequential data across different timescales, training an ML model based on the spatial data, and deploying the trained ML model in the cloud platform to detect tenants engaged in malicious activities. A method also includes accessing sequential activity data for a tenant, converting the sequential data into spatial data by creating multi-dimensional representation(s) expressing the sequential data across different timescales, inputting the spatial data into a trained ML model, and initiating a remedial action against the tenant based on an output indicating that activity data for the tenant has a threshold probability of being malicious.

20 Claims, 7 Drawing Sheets

100

200

300

| Tenant | Timestamp | Activity |
|--------|-----------|----------|
| A | 04/30/24 1:00:00 AM | A1 |
| B | 04/30/24 1:00:37 AM | A1 |
| A | 04/30/24 1:01:33 AM | A1 |
| A | 04/30/24 1:01:54 AM | A2 |
| A | 04/30/24 1:02:10 AM | A2 |
| A | 04/30/24 1:02:45 AM | A2 |
| B | 04/30/24 1:07:02 AM | A2 |
| B | 04/30/24 1:08:23 AM | A3 |
| A | 04/30/24 1:08:37 AM | A1 |
| A | 04/30/24 1:08:52 AM | A2 |
| ... | ... | ... |

Access Sequential Activity Data For A
Tenant Within A Cloud Platform
  701

Convert The Sequential Activity Data Into Spatial Data
  702

Identify A Sequential Activity Data Type
  703

Convert The Sequential Activity Data Of The
Type Into A Multi-Dimensional Representation
  704

Input The Spatial Data To An ML Model
  705

Perform A Remedial Action
  706

DETECTING A MALICIOUS CLOUD TENANT USING SPATIALIZED ACTIVITY DATA

BACKGROUND

Cloud-based tenant hosting services enable organizations to leverage scalable and flexible infrastructure for their computing needs. These services allow customers, referred to as tenants, to operate within a dedicated identity domain, such as an identity management service. Within this domain, tenants have the autonomy to create and manage user accounts, define roles and permissions, and deploy various resources, including virtual machines, databases, storage solutions, and applications. This tenant-centric approach ensures isolation and customizability while sharing the underlying physical infrastructure, providing a cost-effective solution for businesses of all sizes.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, for deploying a machine learning (ML) model to detect malicious tenants based on spatialized activity data, including: accessing sequential activity data for a tenant within a cloud platform, the sequential activity data including a set of time-sequential data points corresponding to a type of activity within the tenant; converting the sequential activity data into spatial data, including generating a multi-dimensional representation of the set of time-sequential data points, wherein the multi-dimensional representation expresses the set of time-sequential data points within at least a first dimension representing a first timescale and a second dimension representing a second timescale; generating a trained ML model based on using the spatial data as a training input for an ML model; and deploying the trained ML model within the cloud platform for detecting tenants associated with malicious activity.

In some aspects, the techniques described herein relate to methods, systems, and computer program products, for detecting malicious tenants based on spatialized activity data, including: accessing sequential activity data for a tenant within a cloud platform, the sequential activity data including a set of time-sequential data points corresponding to a type of activity within the tenant; converting the sequential activity data into spatial data, including generating a multi-dimensional representation of the set of time-sequential data points, wherein the multi-dimensional representation expresses the set of time-sequential data points within at least a first dimension representing a first timescale and a second dimension representing a second timescale; inputting the spatial data to a trained ML model; and initiating a remedial action against the tenant based on the trained ML model outputting an indication that activity data for the tenant has a threshold probability of being malicious.

In some aspects, the techniques described herein relate to methods, systems, and computer program products, including: accessing sequential activity data for a tenant within a cloud platform, the sequential activity data including: a first set of time-sequential data points corresponding to a first type of activity within the tenant; and a second set of time-sequential data points corresponding to a second type of activity within the tenant; converting the sequential activity data into spatial data, including: generating a first multi-dimensional representation of the first set of time-sequential data points, wherein the first multi-dimensional representation expresses the first set of time-sequential data points within at least a first dimension representing a first timescale and a second dimension representing a second timescale; and generating a second multi-dimensional representation of the second set of time-sequential data points, wherein the second multi-dimensional representation expresses the second set of time-sequential data points within at least the first dimension and the second dimension; inputting the spatial data to a trained ML model; and initiating a remedial action against the tenant based on the trained ML model outputting an indication that activity data for the tenant has a threshold probability of being malicious.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 3 illustrates an example of activity data for tenants within a cloud platform.

DETAILED DESCRIPTION

Figure 1:
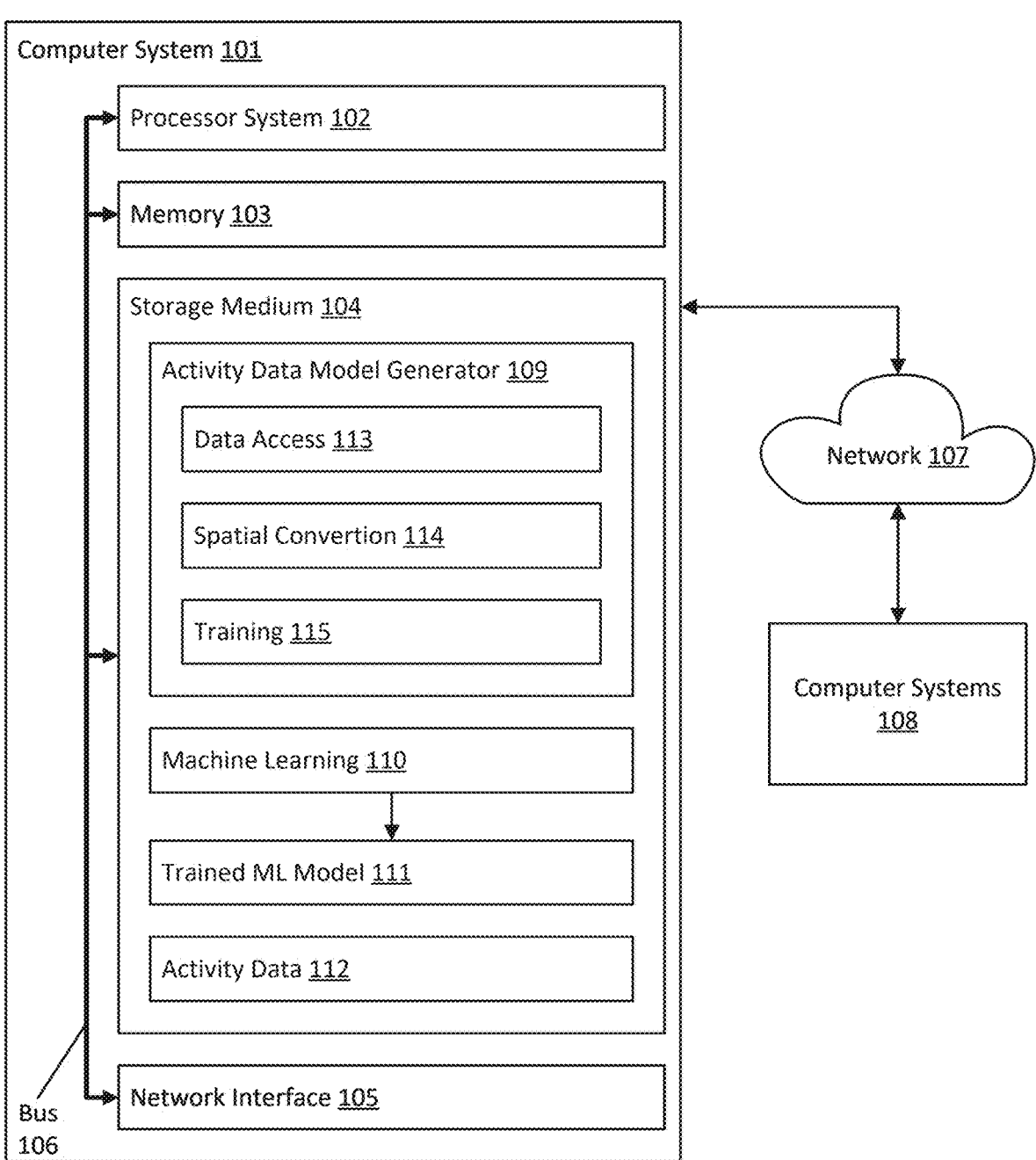
FIG. 1 illustrates an example of a computer architecture that facilitates deploying a machine learning (ML) model to detect malicious tenants based on spatialized activity data.

One aspect of cloud tenant hosting is the balance between enabling tenant autonomy and maintaining overall platform integrity. While tenants can freely configure their environments and deploy resources, the operator of the cloud service must ensure that its platform is not exploited for malicious purposes. For instance, a tenant could misuse the service to send phishing emails, execute distributed denialof-service (DDoS) attacks, or engage in other fraudulent activities. Such misuse can tarnish the cloud provider's reputation, compromise the security of other tenants, and expose the platform to legal liabilities.

Identifying and remediating malicious activity within a cloud-hosting environment presents significant challenges. First, the sheer scale and complexity of modern cloud platforms make it difficult to monitor all activities in real time without introducing performance bottlenecks. Second, tenants often encrypt their data and communications, limit- ing the operator's visibility into potentially harmful activi- ties. Additionally, legitimate usage patterns can sometimes resemble malicious behaviors, making it challenging to distinguish between the two without risking false positives that could disrupt normal operations for innocent tenants. Finally, malicious actors may exploit sophisticated tech- niques to obfuscate their activities, such as frequently changing attack vectors or leveraging compromised tenant accounts.

To address the challenges of identifying and remediating malicious activity, cloud service operators require advanced detection mechanisms that combine behavioral analytics and real-time monitoring. These systems must be capable of analyzing vast amounts of data to identify anomalous pat- terns indicative of malicious behavior while minimizing false positives. Due to the sheer amount of data to be analyzed and the sophistication of threat actors, identifying and remediating malicious activity remains a significant challenge for cloud service operators. For example, a given cloud service may have millions of tenants, with millions of activities occurring for each tenant within a short time span. While machine learning (ML) has been attempted to help identify malicious activities, many sequential ML tech- niques, such as recurrent neural networks (RNNs) and long short-term memory (LSTM), are not suitable since sequences of tenant activity can be very long and up to millions of activities.

The embodiments described herein address the problem of analyzing tenant activity data by converting sequential tenant activity data into spatial data, e.g., a multi-dimen- sional representation comprising two or more dimensions, and then analyzing the tenant activity data using spatial ML techniques, such as those employed by a Convolutional Neural Network (CNN) analyzing image data. These spatial analysis techniques can efficiently process vast amounts of tenant activity data, utilizing spatial ML, such as a CNN, to characterize whether a given tenant's activity data appears malicious or typical.

In embodiments, converting sequential tenant activity data into spatial data includes creating an aggregated rep- resentation of tenant activity data, separated by activity type. For example, embodiments may aggregate tenant activity data over discrete time periods, such as periods of minutes, hours, or days, resulting in sequential data indicating, for each activity type, a count of the total number of instances of that activity type that occurred during each discrete time period.

In embodiments, converting sequential tenant activity data into spatial data also includes converting this aggregate activity data into a spatial representation, such as a two- dimensional image in which each pixel in the image corre- sponds to one of these discrete time periods and a value of the pixel corresponds to the count of the instances of an activity type that occurred during that time period. For example, if each discrete time period is one hour, then an image representation can map those time periods to pixels based on using hours for one image axis and days for another image axis. In a particular example, a 7×24 image can represent a week of a tenant's activity data for a particular activity type, with each pixel in the image indicating a total number of instances of that activity type over an hour period of time.

In embodiments, converting sequential tenant activity data into spatial data comprises creating a plurality of spatial representations for each tenant, with each spatial represen- tation corresponding to a different activity type. For instance, for a given week of activity data for a given tenant, embodiments may create a first spatial representation (e.g., first image) for "add user" activity events, may create a second spatial representation (e.g., second image) for "delete user" activity events, may create a third spatial representation (e.g., third image) for "add group" activity events, and so on. Continuing the particular example above, a series of 7×24 images can represent different aspects of a week of activity data for a given tenant, with each image corresponding to a different activity type, such as "add user," "delete user," "add group," "delete group," and so on. Thus, the embodiments create a compact spatial representation (e.g., several images, which may have a relatively low image resolution, such as 7×24 for a week, 30×24 for a month, and so on) from potentially millions of data points.

In embodiments, these spatial tenant data are then utilized as input to an ML model suitable for analyzing multi- dimensional data, such as images. In one example, these spatial tenant data are used as input for a CNN, which is well-suited to the analysis of image data. In this embodi- ment, the CNN may be referred to as an "enhanced CNN security model." In embodiments and drawing inspiration from the RGB (Red, Green, Blue) channels in many images, a set of multi-dimensional data representations (e.g., two or more images) are analyzed in parallel by supplying each multi-dimensional data representation as a different image data channel, e.g., using an "add user" image representation as one image data channel, using a "delete user" image representation as another image data channel, and so on. In embodiments, using spatial tenant data as input to an ML model includes using spatial tenant data input to train an ML model (e.g., an untrained CNN model) to classify tenant activity data (e.g., malicious/benign, anomalous/typical). In embodiments, using spatial tenant data input to an ML model also includes using spatial tenant data input to a trained ML model (e.g., a trained CNN model) to classify a tenant's activity (e.g., malicious/benign, anomalous/typi- cal).

FIG. 1 illustrates an example 100 of a computer archi- tecture that facilitates deploying an ML model to detect malicious tenants based on spatialized activity data. In FIG. 1, the computer architecture includes a computer system 101, which comprises a processor system 102 (e.g., a single processor or a plurality of processors), a memory 103 (e.g., system or main memory), a storage medium 104 (e.g., a single computer-readable storage medium, or a plurality of computer-readable storage media), and a network interface 105 (e.g., one or more network interface cards), all inter- connected by a bus 106. As shown, computer system 101 interconnects via network 107 to computer systems 108 (e.g., a single computer system or a plurality of computer systems).

As mentioned, the computer architecture of example 100 facilitates deploying an ML model to detect malicious tenants based on spatialized activity data. Thus, computer system 101 is configured to generate/train an ML model for detecting malicious tenants based on spatialized activity data and deploy a trained model for detecting malicious tenants.

Figure 2:
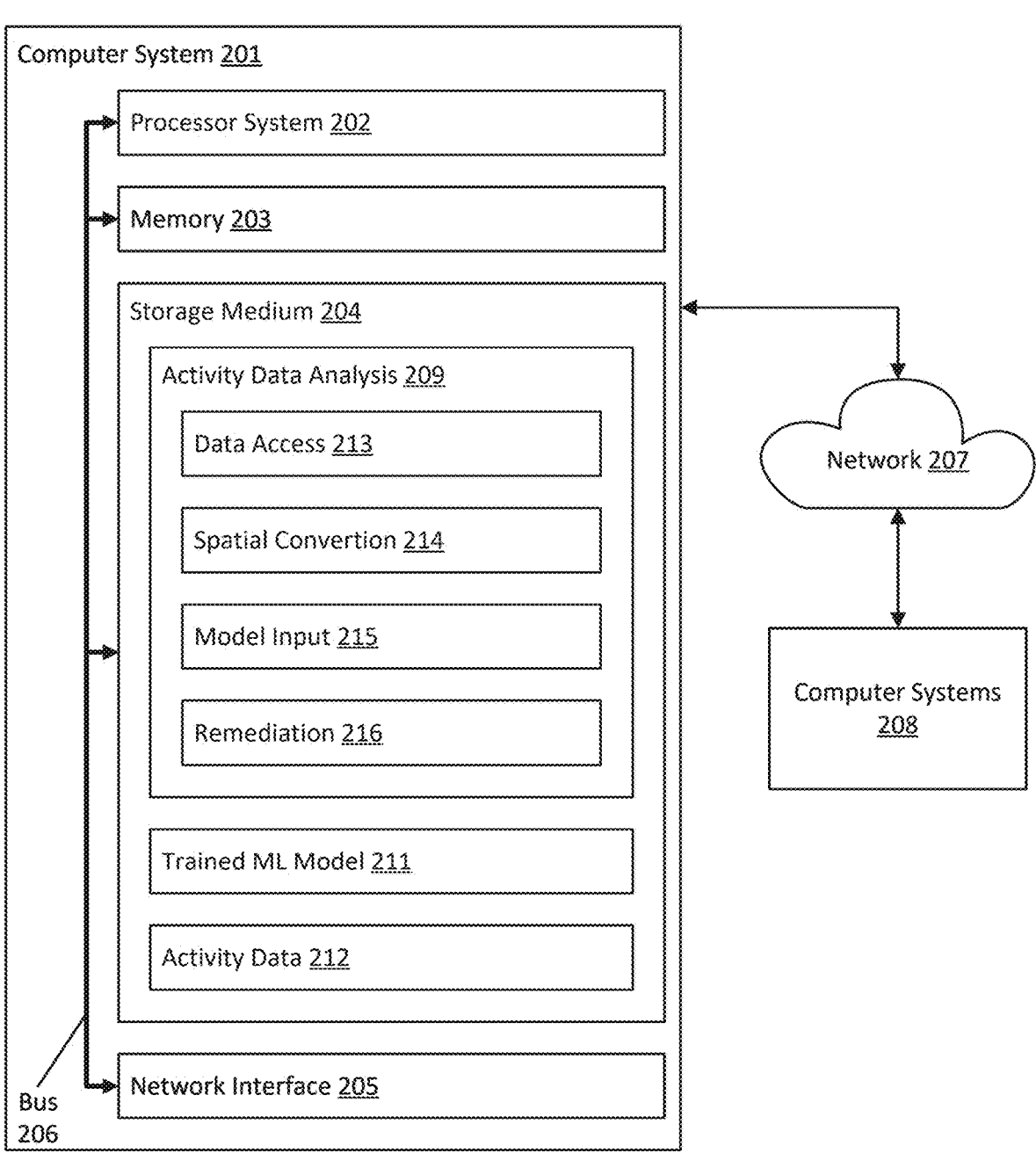
FIG. 2 illustrates an example of a computer architecture that facilitates detecting malicious tenants based on spatialized activity data.

For example, in embodiments, computer system 101 is configured to generate/train an ML model based on tenant activity data obtained from tenant activity at computer systems 108 operated by a cloud service provider and to deploy that trained ML model (e.g., to one of computer system 108, with computer system 201 of FIG. 2 being one example) to detect malicious tenant activity at computer systems 108.

In FIG. 1, storage medium 104 stores computer-executable instructions implementing at least an activity data model generator component (model generator component 109) and an ML component 110. In FIG. 1, storage medium 104 also stores a trained ML model 111 and activity data 112. In embodiments, model generator component 109 produces spatialized activity data from activity data 112 and uses this spatialized activity data as a training input to ML component 110 to generate trained ML model 111. In some examples, trained ML model 111 is a CNN, but embodiments could utilize any other ML model suitable for processing spatial data, such as images. For example, in some embodiments, trained ML model 111 may be a transformer ML model.

In some examples, activity data 112 comprises activity data for a plurality of tenants, with the activity data for each tenant being labeled as representing malicious/anomalous activity or representing benign/typical activity (e.g., ground-truth data). In these embodiments, ML component 110 utilizes supervised training techniques to produce trained ML model 111. In other examples, activity data 112 unlabeled activity data for a plurality of tenants, and ML component 110 utilizes supervised training techniques to produce trained ML model 111. In various embodiments, activity data 112 is actual activity data obtained from tenants operating at computer systems 108, activity data 112 is synthetically generated activity data, or activity data 112 comprises a combination of actual activity data and synthetically generated activity data.

FIG. 1 illustrates model generator component 109 as including a data access component 113, a spatial conversion component 114, and a training component 115. In embodiments, data access component 113 accesses the activity data 112 from storage medium 104, or from at least one of computer systems 108, for use in producing trained ML model 111. In embodiments, spatial conversion component 114 converts the activity data 112 to per-tenant spatialized training data. For example, spatial conversion component 114 may convert activity data 112 into a plurality of images for each tenant, with each image corresponding to a different type of activity. The operation of spatial conversion component 114 is described in further detail in connection with FIGS. 3-4 and 6. In embodiments, training component 115 provides the spatialized activity data generated by spatial conversion component 114 as input to ML component 110 to produce trained ML model 111. Examples of operation of training component 115 and ML component 110 are described in further detail in connection with FIGS. 5-6.

FIG. 2 illustrates an example 200 of a computer architecture that facilitates detecting malicious tenants based on spatialized activity data. In FIG. 2, the computer architecture includes a computer system 201, which comprises a processor system 202 (e.g., a single processor or a plurality of processors), a memory 203 (e.g., system or main memory), a storage medium 204 (e.g., a single computer-readable storage medium, or a plurality of computer-readable storage media), and a network interface 205 (e.g., one or more network interface cards), all interconnected by a bus 206. As shown, computer system 201 interconnects via network 207 to a computer system 208 (e.g., a single computer system or a plurality of computer systems).

As mentioned, the computer architecture of example 200 facilitates detecting malicious tenants based on spatialized activity data. Thus, computer system 201 is configured to detect malicious tenants based on generating spatialized activity data from sequential tenant activity data and input the generated spatialized activity data to a trained ML model (e.g., trained by computer system 201 of FIG. 1) that has been trained to detect malicious tenants based on spatialized activity data. For example, in embodiments, computer system 201 is configured to generate spatialized activity data from sequential tenant activity data obtained from tenant activity at computer systems 108 operated by a cloud service provider and to use a trained ML model (e.g., the trained ML model 111 generated by computer system 101) to detect malicious tenant activity at computer systems 108.

In some embodiments, computer system 101 and computer system 201 are distinct computer systems, and, e.g., computer system 101 deploys trained ML model 111 to computer system 201. In other embodiments, computer system 101 and computer system 201 are the same computer system.

In FIG. 2, storage medium 204 stores computer-executable instructions implementing at least an activity data analysis component (analysis component 209). In FIG. 2, storage medium 204 also stores a trained ML model 211 and activity data 212. In embodiments, analysis component 209 produces spatialized activity data for a tenant from activity data 112 and inputs this spatialized activity data to trained ML model 211 (e.g., trained ML model 111 generated by computer system 101). The trained ML model 211 then outputs a prediction of the probability (e.g., a value between 0 and 1 or between 0 and 100) of that tenant's data being malicious/anomalous. In embodiments, when the prediction is above a predetermined threshold (e.g., 0.8 or 80, 0.9 or 90, 0.95 or 95, 0.99 or 99), analysis component 209 initiates a remedial action for that tenant. In some examples, trained ML model 211 is a CNN, but embodiments could utilize any other ML model suitable for processing spatial data, such as images. For example, in some embodiments, trained ML model 211 may be a transformer ML model.

FIG. 2 illustrates analysis component 209 as including a data access component 213, a spatial conversion component 214, a model input component 215, and a remediation component 216. In embodiments, data access component 213 accesses the activity data 212 from storage medium 104, or from at least one of computer systems 108. In embodiments, spatial conversion component 214 converts the activity data 212 to per-tenant spatialized data. For example, spatial conversion component 214 may convert activity data 112 into a plurality of images for each tenant, with each image corresponding to a different type of activity. The operation of spatial conversion component 214 is described in further detail in connection with FIGS. 3-4 and 6. In embodiments, model input component 215 inputs per-tenant spatialized data to trained ML model 211, which outputs a prediction of the probability of that tenant's data being malicious/anomalous. In embodiments, if the output of trained ML model 211 for a given tenant's spatialized activity data is above a predetermined threshold (e.g., 0.8 or 80, 0.9 or 90, 0.95 or 95, 0.99 or 99), then the tenant is considered by analysis component 209 to be associated with malicious/anomalous activity, and remediation component 216 initiates a remedial action against that tenant. The remedial action can vary depending on implementation and on factors such as the particular value of the output of trained ML model 211, a history (or lack) of prior classifications of malicious/anomalous activity for the tenant, a total age of the tenant's account, etc. In some examples, the remedial action is one or more of disabling the tenant, deleting the tenant, initiating a message to a contact associated with the tenant, or blocking network activity by a service within the tenant.

FIG. 3 illustrates an example 300, showing a table of tenant activity data for a plurality of tenants within a cloud platform. The data shown in example 300 of activity data 112 that are accessed by data access component 113 and/or activity data 212 that are accessed by data access component 213. In some embodiments, such activity data are obtained from an audit log maintained by the cloud platform and comprises a sequential log of the occurrence of tenant activities (here, tenant A and tenant B), such as adding/deleting users, adding/deleting groups, adding/removing a user to/from a group, creating/deleting a service principal, and so on. In example 300, such activities are represented as A1 (e.g., adding a user), A2 (deleting a user), A3 (e.g., adding a group), and so on. Ellipses in the final row of the table indicate that the tenant activity data can include any number of entries, and indeed, in many cloud platforms, the tenant activity data for a single tenant could number in the millions of entries per day. Although example 300 shows a combined table interleaving activities for tenant A and tenant B, one of ordinary skill in the art will recognize that the activity data for different tenants may be alternatively segregated into different per-tenant data sets.

Figure 4:
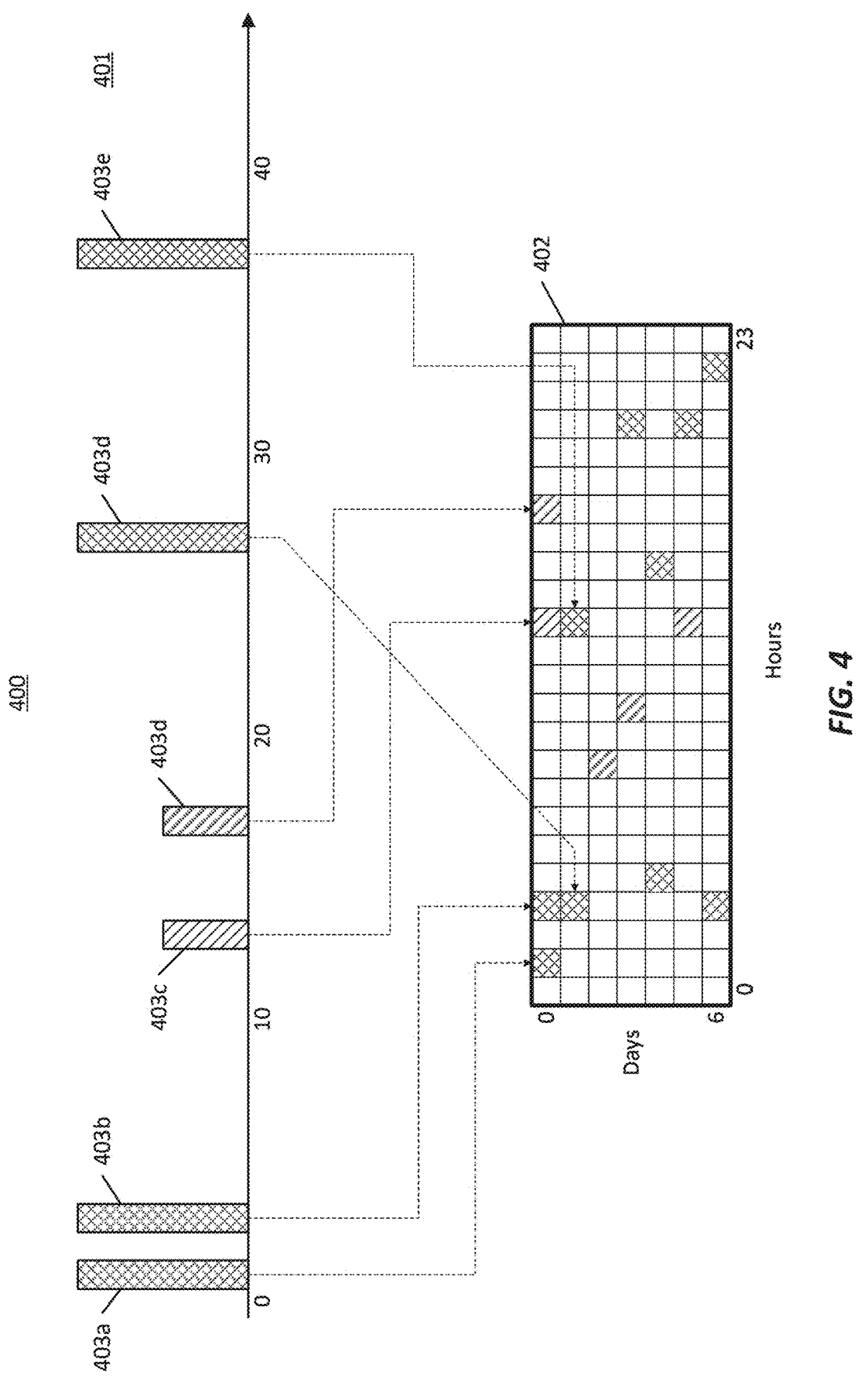
FIG. 4 illustrates an example of converting sequential activity data into spatial data.

FIG. 4 illustrates an example 400 of converting sequential activity data into spatial data, e.g., by spatial conversion component 114 and/or spatial conversion component 214. As mentioned, in embodiments, converting sequential tenant activity data into spatial data includes creating an aggregate representation of tenant activity data, separated by activity type. For example, embodiments may aggregate tenant activity data over discrete time periods (e.g., minutes, hours, days), resulting in sequential one-dimensional data indicating a count of the total number of instances of activities of a particular type that occurred during each discrete time period. FIG. 4 illustrates this aggregate data as a timeline 401 showing aggregate activity data for a single activity during discrete one-hour time periods, starting at hour zero (e.g., 12 AM) and extending for an indefinite period—but for at least about 40 hours in the example. In example 400, timeline 401 shows a plurality of aggregate data bars 403a-403e, each showing the total count of occurrences of that activity type during a given one-hour period. For example, based on their height, aggregate data bar 403a, 403b, 403d, and 403e each show a first number of events during hours 1, 3, 27, and 37, respectively. Additionally, based on their height, aggregate data bar 403c and 403d each show a second number of events during hours 13 and 17, respectively.

As was also mentioned, converting sequential tenant activity data into spatial data also includes converting aggregate activity data into a spatial representation, such as a two-dimensional image in which each pixel in the image corresponds to one of these discrete time periods and a value of the pixel corresponds to the count of the instances of an activity type that occurred during that time period. FIG. 4 illustrates this spatialized data as a multi-dimensional representation 402, in which the y-axis represents days (e.g., 7 days in the example), the x-axis represents hours (e.g., 24 hours in the example), and in which the intersection of these axes each corresponds to a one-hour period of time. As indicated by broken arrows extending from timeline 401 to multi-dimensional representation 402, the aggregate values represented in timeline 401 are mapped into multi-dimensional representation 402. While each value represented in timeline 401 would be mapped to multi-dimensional representation 402, for clarity in illustration, the broken arrows only show mappings for the hours in which the aggregate count is non-zero. Multi-dimensional representation 402 also shows several non-zero values beyond those illustrated in the portion of timeline 401 shown in FIG. 4.

In some embodiments, each intersection (e.g., pixel) in multi-dimensional representation 402 directly reflects the aggregate count from timeline 401, and FIG. 4 utilizes diagonal and cross-hatch shading to indicate these varying aggregate counts. In some embodiments, such as when multi-dimensional representation 402 corresponds to image data, the value of each intersection (e.g., pixel) may vary depending on the bit-depth of the image. In one example, each intersection (e.g., pixel) can range in value from zero to 255 (e.g., an 8-bit or 1-byte value per pixel). In embodiments, an aggregate count may exceed the available value (e.g., exceed 255). Thus, in some embodiments, aggregate values within timeline 401 are scaled to a value that does not exceed the available value, e.g., based on the maximum value found in timeline 401, based on a predefined maximum value (e.g., that could reasonably be found in timeline 401) and the like. For example, assuming the first number of events represented by aggregate data bar 403a, 403b, 403d, and 403e is 1000, assuming the second number of events represented by aggregate data bar 403c and 403d is 500, and assuming that each pixel can contain a value from zero to 255, then the 1000 and 500 count values may be scaled to 255 and 128, respectively, within multi-dimensional representation 402.

Figure 5:
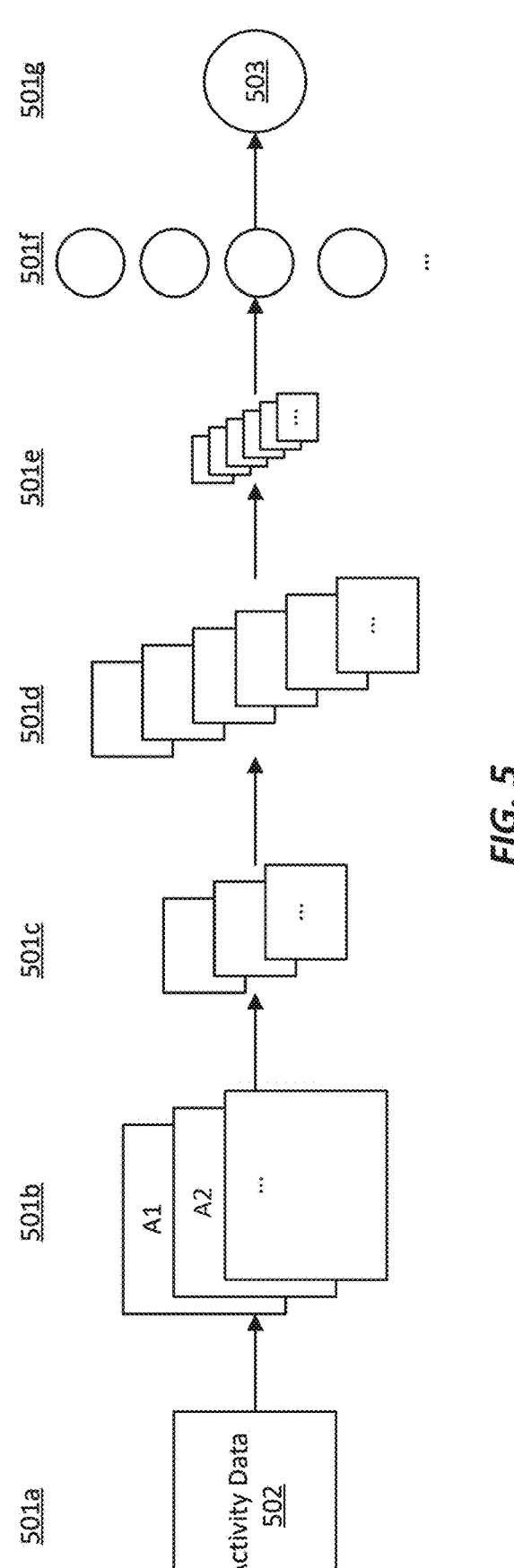
FIG. 5 illustrates an example of training a convolutional neural network with spatial data derived from sequential activity data.

FIG. 5 illustrates an example 500 of training a convolutional neural network with spatial data derived from sequential activity data, e.g., by model generator component 109 and ML component 110, demonstrating the various stages (e.g., steps 501a-501g) of data processing and neural network computation. While example 500 is provided for illustration, there are a variety of ways to train neural networks, and this example is non-limiting.

The process begins at step 501a, where spatial conversion component 114 takes sequential activity data 502 for a given tenant (e.g., activity data 112) and, using the process described in connection with FIGS. 3 and 4, converts the sequential activity data into spatialized multi-dimensional data, such as a set of images, each corresponding to a different activity type.

At step 501b, this set of input images, such as A1, A2, etc., are supplied to the network. Each image may represent a different channel of the input data, such as a different activity type for a given tenant, and may be supplied to the network analogous to if they were color channels (e.g., Red, Green, Blue). These images form the training input dataset for the CNN and are fed into the subsequent layers of the network.

At step 501c, the input images undergo a downscaling operation, where their spatial dimensions are reduced, for example, by half. This downscaling process can involve techniques such as strided convolution, interpolation, or resizing. Step 501c decreases the resolution of the input images, thereby reducing computational complexity while retaining the most distinguishing image features for subsequent processing. Downscaling also helps to normalize the input size for compatibility with the convolutional layers, ensuring consistent processing throughout the network. By decreasing the dimensionality of the input images, the network can focus on higher-level features without being overly burdened by finer-grained details.

Step 501*d* involves pooling operations, which reduce the spatial dimensions of the feature maps generated by the preceding convolutional layers. Pooling techniques, such as max pooling or average pooling, are employed to down-sample the data, reducing computational complexity while retaining the most significant features. The resulting feature maps, represented as stacked layers, are progressively passed through multiple pooling layers to extract increasingly abstracted representations.

In step 501*e*, the processed feature maps are flattened. Flattening transforms the two-dimensional matrices into a one-dimensional vector, enabling compatibility with the fully connected layers of the neural network. This operation prepares the data for subsequent dense layer processing and decision-making.

Step 501*f* represents the generation of neurons through fully connected layers. Each neuron receives weighted inputs from the preceding layer and applies an activation function to introduce non-linearity, enabling the network to model complex relationships within the data. These neurons form the core computational units of the CNN, with multiple layers progressively refining the learned features.

Finally, step 501*g* depicts the output generation (output 503) of the network. The fully connected layers aggregate the learned features and produce an output, which may represent predictions. For instance, the output layer may assign a probability score to an input, indicating the likelihood that a given input is malicious/anomalous.

In embodiments, to refine the model's performance, the CNN training pipeline incorporates labels or ground truth data associated with the input images. During the training process, the predicted output (output 503) generated in step 501*g* is compared against the corresponding ground truth labels (e.g., the labels described in connection with activity data 112) using a predefined loss function, such as categorical cross-entropy or mean squared error. The loss function quantifies the difference between the predicted and actual outputs, serving as a measure of the model's accuracy. Through backpropagation, the loss is propagated backward through the network, updating the weights and biases of the neurons in step 501*f*. This iterative process minimizes the loss by adjusting the network parameters, enabling the CNN to progressively learn the optimal feature representations and improve its ability to generalize to unseen data. By leveraging labeled training data, the backpropagation mechanism ensures that the model aligns its predictions with the ground truth, enhancing its overall accuracy and reliability.

The following discussion now refers to a number of methods and method acts. Although the method acts are discussed in specific orders or are illustrated in a flow chart as occurring in a particular order, no order is required unless expressly stated or required because an act is dependent on another act being completed prior to the act being performed.

Embodiments are now described in connection with FIG. 6, which illustrates a flow chart of an example method 600 for deploying an ML model to detect malicious tenants based on spatialized activity data. In embodiments, instructions for implementing method 600 are encoded as computer-executable instructions (e.g., model generator component 109) stored on a computer storage medium (e.g., storage medium 104) that are executable by a processor (e.g., processor system 102) to cause a computer system (e.g., computer system 101) to perform method 600.

Figure 6:
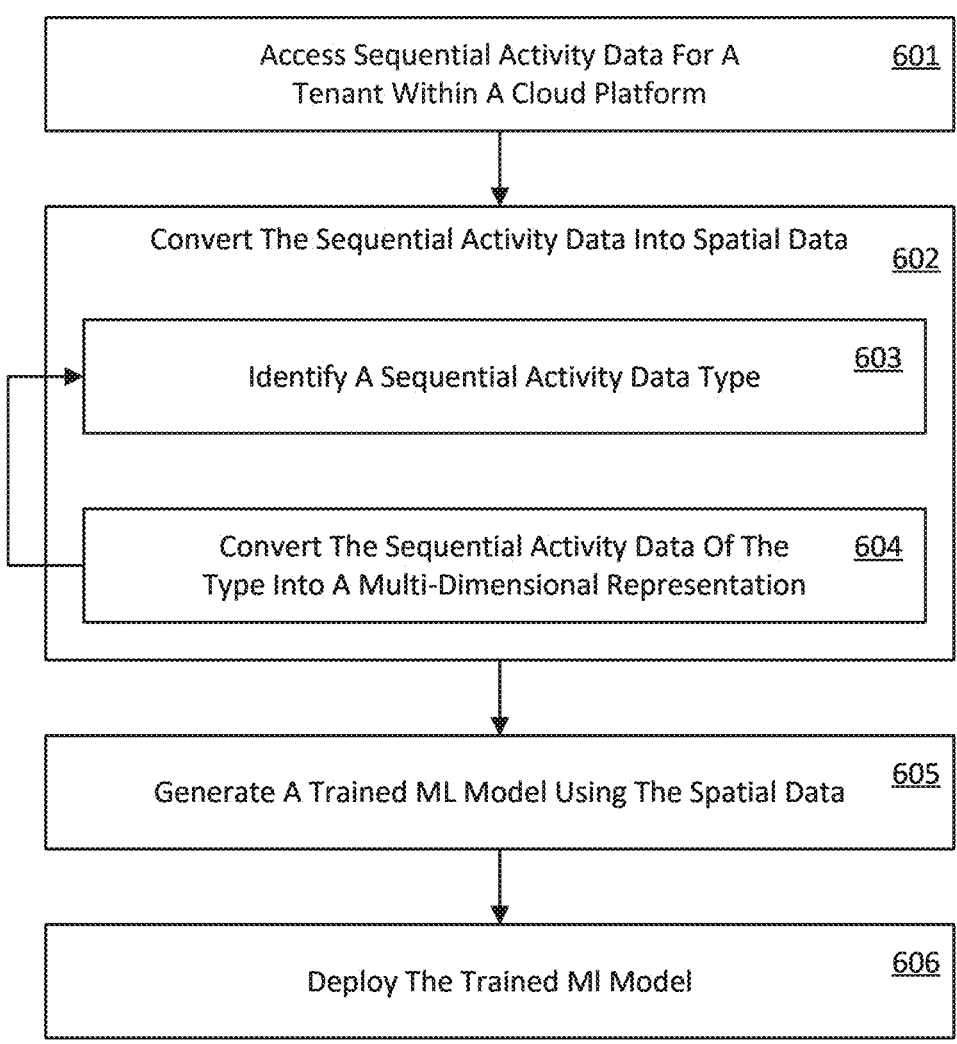
FIG. 6 illustrates a flow chart of an example of a method for deploying an ML model to detect malicious tenants based on spatialized activity data.

Referring to FIG. 6, in embodiments, method 600 comprises act 601 of accessing sequential activity data for a tenant within a cloud platform. In some embodiments, act 601 comprises accessing sequential activity data for a tenant within a cloud platform. For example, data access component 113 accesses activity data 112, comprising activity data for a plurality of tenants. Activity data may labeled (e.g., as representing malicious/anomalous activity or representing benign/typical activity). Activity data 112 may be actual activity data (e.g., obtained for an actual tenant), may be synthetically generated (e.g., generated for a hypothetical tenant), or a combination of actual and synthetic data.

Method 600 also comprises act 602 of converting the sequential activity data into spatial data. For example, spatial conversion component 114 converts activity data 112 to spatial data, such as a set of images, as described in connection with FIGS. 3 and 4.

In FIG. 6, method 600 includes act 603 of identifying a sequential activity data type. For example, the activity data accessed in act 601 comprises a first set of time-sequential data points corresponding to a first type of activity within the tenant. For example, in example 300, the represented activity data includes activity data for activity A1. As examples, activities may be user creation, user deletion, service principal creation, service principal deletion, group creation, group deletion, or group modification.

In FIG. 6, method 600 also includes act 604 of converting the sequential activity data of the type into a multi-dimensional representation. In embodiments, act 604 comprises converting the sequential activity data into spatial data, including generating a first multi-dimensional representation of the first set of time-sequential data points, wherein the first multi-dimensional representation expresses the first set of time-sequential data points within at least a first dimension representing a first timescale and a second dimension representing a second timescale. For example, FIG. 4 illustrates converting the aggregated time-sequential data of timeline 401 into multi-dimensional representation 402.

An arrow extending from act 604 to act 603 indicates that these acts can be repeated for any number of activity types (e.g., activities A2, A3, etc., in example 300). For example, in another iteration of act 603, the activity data accessed in act 601 may also comprise a second set of time-sequential data points corresponding to a second type of activity within the tenant. Thus, in another iteration of act 604, converting the sequential activity data into spatial data also includes generating a second multi-dimensional representation of the second set of time-sequential data points, wherein the second multi-dimensional representation expresses the second set of time-sequential data points within at least the first dimension and the second dimension.

In some embodiments, such as the example shown in example 400, the first timescale is hours (e.g., x-axis), and the second timescale is days (e.g., y-axis). However, any appropriate timescales could be used (e.g., minutes and hours, days and weeks, etc.) for either axis. Additionally, although embodiments have described two dimensions/axes, embodiments would utilize one or more additional dimensions/axes.

As described in connection with example 400, in some embodiments, the first multi-dimensional representation of the first set of time-sequential data points is an image comprising a plurality of pixels. In these embodiments, a value of each pixel in the plurality of pixels represents an aggregate number of occurrences of the first type of activity over a period of time (e.g., minute, hour, day) corresponding to an intersection of the first dimension and the second dimension at the pixel. In embodiments, the value of each pixel represents the aggregate number of occurrences of the first type of activity over the period of time, e.g., as a scaled value between zero and 255 in some examples.

Method 600 also comprises act 605 of generating a trained ML model using the spatial data. In some embodiments, act 605 comprises generating a trained ML model based on using the spatial data as a training input for an ML model. For example, training component 115 provides the spatial data generated by spatial conversion component 114 to ML component 110 for producing trained ML model 111. In some embodiments, the trained ML model is a trained CNN model, but other ML models capable of operating on multidimensional data such as images may be used.

In some examples, such as the one shown in example 500, using the spatial data as the training input for the ML model comprises using one or more images as the training input for the ML model. In embodiments that use multiple images (e.g., each a monochromatic image corresponding to a different activity type), using the spatial data as the training input for the ML model comprises using a first image and a second image as the training input for the ML model, including using the first image as a first image channel and using the second image as a second image channel. Any number of images and image channels may be used.

Method 600 also comprises act 606 of deploying the trained ML model. In some embodiments, act 606 comprises deploying the trained ML model within the cloud platform for detecting tenants associated with malicious activity. For example, remedial actions may include disabling a tenant, deleting a tenant, initiating a message to a contact associated with a tenant, and blocking network activity by a service within a tenant.

Embodiments are now described in connection with FIG. 7, which illustrates a flow chart of an example method 700 for detecting malicious tenants based on spatialized activity data. In embodiments, instructions for implementing method 700 are encoded as computer-executable instructions (e.g., analysis component 209) stored on a computer storage medium (e.g., storage medium 204) that are executable by a processor (e.g., processor system 202) to cause a computer system (e.g., computer system 201) to perform method 700.

Figure 7:
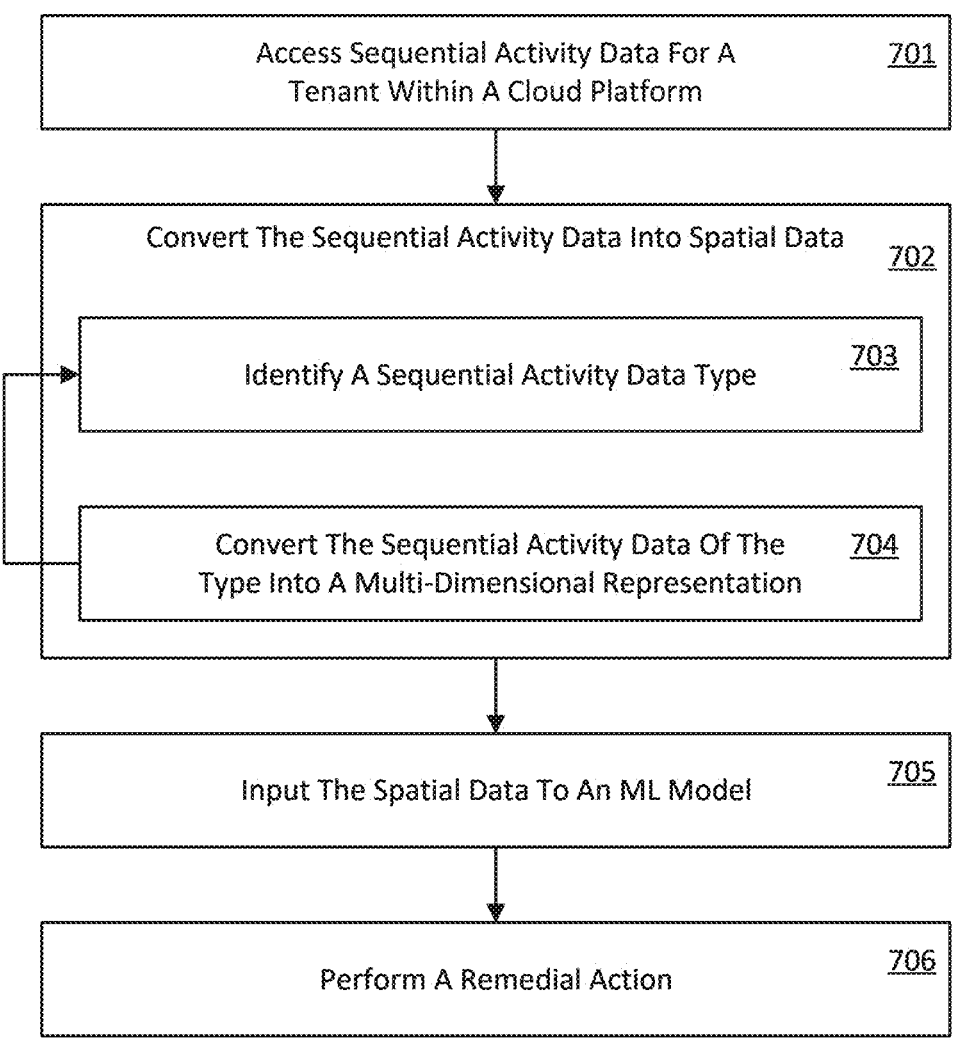
FIG. 7 illustrates a flow chart of an example of a method for detecting malicious tenants based on spatialized activity data.

Referring to FIG. 7, in embodiments, method 700 comprises act 701 of accessing sequential activity data for a tenant within a cloud platform. In some embodiments, act 701 comprises accessing sequential activity data for a tenant within a cloud platform, the sequential activity data comprising a first set of time-sequential data points corresponding to a first type of activity within the tenant. For example, data access component 213 accesses activity data 212, comprising activity data for one or more plurality of tenants.

In FIG. 7, method 700 includes act 703 of identifying a sequential activity data type. For example, the activity data accessed in act 701 comprises a first set of time-sequential data points corresponding to a first type of activity within the tenant. As examples, activities may be user creation, user deletion, service principal creation, service principal deletion, group creation, group deletion, or group modification.

In FIG. 7, method 700 also includes act 704 of converting the sequential activity data of the type into a multi-dimensional representation. In embodiments, act 704 comprises converting the sequential activity data into spatial data, including generating a first multi-dimensional representation of the first set of time-sequential data points, wherein the first multi-dimensional representation expresses the first set of time-sequential data points within at least a first dimension representing a first timescale and a second dimension representing a second timescale. For example, FIG. 4 illustrates converting the aggregated time-sequential data of timeline 401 into multi-dimensional representation 402.

An arrow extending from act 704 to act 703 indicates that these acts can be repeated for any number of activity types (e.g., activities A2, A3, etc., in example 300). For example, in another iteration of act 703, the activity data accessed in act 601 may also comprise a second set of time-sequential data points corresponding to a second type of activity within the tenant. Thus, in another iteration of act 704, converting the sequential activity data into spatial data also includes generating a second multi-dimensional representation of the second set of time-sequential data points, wherein the second multi-dimensional representation expresses the second set of time-sequential data points within at least the first dimension and the second dimension.

Similar to act 602 in FIG. 6, in some embodiments, the first timescale is hours (e.g., x-axis), and the second timescale is days (e.g., y-axis). However, any appropriate timescales could be used (e.g., minutes and hours, days and weeks, etc.). Additionally, although embodiments have described two dimensions/axes, embodiments would utilize one or more additional dimensions/axes. Also similar to act 602 in FIG. 6, in some embodiments, the first multi-dimensional representation of the first set of time-sequential data points is an image comprising a plurality of pixels, with the description of that image from act 602 also applying in act 702.

Method 700 also comprises act 705 of inputting the spatial data to an ML model. In some embodiments, act 703 comprises inputting the spatial data to a trained ML model. For example, model input component 215 inputs the spatial data generated in act 702 to trained ML model 211, such as a trained CNN model, which produces a probability of that spatial data indicating malicious/anomalous behavior.

Method 700 also comprises act 706 of performing a remedial action. In some embodiments, act 704 comprises initiating a remedial action against the tenant based on the trained ML model outputting an indication that activity data for the tenant has a threshold probability of being malicious. For example, if trained ML model 211 produces a probability over a particular threshold, remediation component 216 initiates a remedial action against a tenant associated with the activity data accessed in act 601. In embodiments, remedial action may be disabling the tenant, deleting the tenant, initiating a message to a contact associated with the tenant, blocking network activity by a service within the tenant, and the like.

Accordingly, described herein are methods and systems for identifying malicious tenants using ML models and spatialized activity data within a cloud platform. A method (e.g., method 600) includes accessing sequential activity data for a tenant, converting the sequential data into spatial data by creating multi-dimensional representation(s) expressing the sequential data across different timescales, training an ML model based on the spatial data, and deploying the trained ML model in the cloud platform to detect tenants engaged in malicious activities. A method (e.g., method 700) also includes accessing sequential activity data for a tenant, converting the sequential data into spatial data by creating multi-dimensional representation(s) expressing the sequential data across different timescales, inputting the spatial data into a trained ML model, and initiating a remedial action against the tenant based on an output indicating that activity data for the tenant has a threshold probability of being malicious.

Alternatively or in addition to the other examples described herein, examples include any combination of the following:

Clause 1. A method implemented in a computer system that includes a processor system, for deploying a machine learning (ML) model to detect malicious tenants based on spatialized activity data, comprising: accessing sequential activity data for a tenant within a cloud platform, the sequential activity data comprising a first set of time-sequential data points corresponding to a first type of activity within the tenant; converting the sequential activity data into spatial data, including generating a first multi-dimensional representation of the first set of time-sequential data points, wherein the first multi-dimensional representation expresses the first set of time-sequential data points within at least a first dimension representing a first timescale and a second dimension representing a second timescale; generating a trained ML model based on using the spatial data as a training input for an ML model; and deploying the trained ML model within the cloud platform for detecting tenants associated with malicious activity.

Clause 2. The method of clause 1, wherein the first timescale is hours and the second timescale is days.

Clause 3. The method of any of clause 1 or claim 2, wherein: the sequential activity data also comprises a second set of time-sequential data points corresponding to a second type of activity within the tenant; and converting the sequential activity data into spatial data also includes generating a second multi-dimensional representation of the second set of time-sequential data points, wherein the second multi-dimensional representation expresses the second set of time-sequential data points within at least the first dimension and the second dimension.

Clause 4. The method of any of clause 1 to claim 3, wherein the first type of activity and the second type of activity are each a type of activity selected from a group consisting of user creation, user deletion, service principal creation, service principal deletion, group creation, group deletion, and group modification.

Clause 5. The method of any of clause 1 to claim 4, wherein the first multi-dimensional representation of the first set of time-sequential data points is an image comprising a plurality of pixels.

Clause 6. The method of clause 5, wherein a value of each pixel in the plurality of pixels represents an aggregate number of occurrences of the first type of activity over a period of time corresponding to an intersection of the first dimension and the second dimension at the pixel.

Clause 7. The method of clause 6, wherein the value of each pixel represents the aggregate number of occurrences of the first type of activity over the period of time as a scaled value between zero and 255.

Clause 8. The method of clause 6, wherein each period of time is one hour.

Clause 9. The method of clause 6, wherein generating the trained ML model comprises generating a trained convolutional neural network (CNN) model.

Clause 10. The method of clause 9, wherein using the spatial data as the training input for the ML model comprises using the image as the training input for the ML model.

Clause 11. The method of clause 9, wherein: the image is a first image comprising a first plurality of pixels; converting the sequential activity data into spatial data also includes generating a second multi-dimensional representation of a second set of time-sequential data points corresponding to a second type of activity within the tenant, wherein the second multi-dimensional representation of the second set of time-sequential data points is a second image comprising a second plurality of pixels; and using the spatial data as the training input for the ML model comprises using the first image and the second image as the training input for the ML model, including using the first image as a first image channel and using the second image as a second image channel.

Clause 12. A method implemented in a computer system that includes a processor system, for detecting malicious tenants based on spatialized activity data, comprising: accessing sequential activity data for a tenant within a cloud platform, the sequential activity data comprising a first set of time-sequential data points corresponding to a first type of activity within the tenant; converting the sequential activity data into spatial data, including generating a first multi-dimensional representation of the first set of time-sequential data points, wherein the first multi-dimensional representation expresses the first set of time-sequential data points within at least a first dimension representing a first timescale and a second dimension representing a second timescale; inputting the spatial data to a trained machine learning (ML) model; and initiating a remedial action against the tenant based on the trained ML model outputting an indication that activity data for the tenant has a threshold probability of being malicious.

Clause 13. The method of clause 12, wherein the first timescale is hours and the second timescale is days.

Clause 14. The method of any of clause 12 or claim 13, wherein: the sequential activity data also comprises a second set of time-sequential data points corresponding to a second type of activity within the tenant; and converting the sequential activity data into spatial data also includes generating a second multi-dimensional representation of the second set of time-sequential data points, wherein the second multi-dimensional representation expresses the second set of time-sequential data points within at least the first dimension and the second dimension.

Clause 15. The method of any of clause 12 to claim 14, wherein the remedial action is an action selected from a group consisting of disabling the tenant, deleting the tenant, initiating a message to a contact associated with the tenant, and blocking network activity by a service within the tenant.

Clause 16. The method of any of clause 12 to claim 15, wherein the trained ML model is a trained convolutional neural network (CNN) model.

Clause 17. The method of any of clause 12 to claim 16, wherein the first multi-dimensional representation of the first set of time-sequential data points is an image comprising a plurality of pixels.

Clause 18. The method of clause 17, wherein a value of each pixel in the plurality of pixels represents an aggregate number of occurrences of the first type of activity over a period of time corresponding to an intersection of the first dimension and the second dimension at the pixel.

Clause 19. The method of clause 18, wherein the value of each pixel represents the aggregate number of occurrences of the first type of activity over the period of time as a scaled value between a minimum pixel value and a maximum pixel value.

Clause 20. A computer system comprising: a processor system; and a computer storage medium that stores computer-executable instructions that are executable by the processor system to at least: access sequential activity data for a tenant within a cloud platform, the sequential activity data comprising: a first set of time-sequential data points corresponding to a first type of activity within the tenant; and a second set of time-sequential data points corresponding to a second type of activity within the tenant; convert the sequential activity data into spatial data, including: generating a first multi-dimensional representation of the first set of time-sequential data points, wherein the first multi-dimensional representation expresses the first set of time-sequential data points within at least a first dimension representing a first timescale and a second dimension representing a second timescale; and generating a second multi-dimensional representation of the second set of time-sequential data points, wherein the second multi-dimensional representation expresses the second set of time-sequential data points within at least the first dimension and the second dimension; input the spatial data to a trained machine learning (ML) model; and initiate a remedial action against the tenant based on the trained ML model outputting an indication that activity data for the tenant has a threshold probability of being malicious.

Embodiments of the disclosure comprise or utilize a special-purpose or general-purpose computer system (e.g., computer system 101, computer system 201) that includes computer hardware, such as, for example, a processor system (e.g., processor system 102, processor system 202) and system memory (e.g., memory 103, memory 203), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104, storage medium 204). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105, network interface 205) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more virtual machines (VMs). During operation, VMs emulate an operational computing system, supporting an operating system (OS) and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system, for deploying a machine learning (ML) model to detect malicious tenants based on spatialized activity data, comprising:

accessing sequential activity data for a tenant within a cloud platform, the sequential activity data comprising:

a first set of time-sequential data points corresponding to a first type of activity within the tenant; and a second set of time-sequential data points corresponding to a second type of activity within the tenant;

converting the sequential activity data into spatial data, including;

generating a first multi-dimensional representation of the first set of time-sequential data points, wherein the first multi-dimensional representation expresses the first set of time-sequential data points within at least a first dimension representing a first timescale and a second dimension representing a second timescale; and generating a second multi-dimensional representation of the second set of time-sequential data points, wherein the second multi-dimensional representation expresses the second set of time-sequential data points within at least the first dimension and the second dimension;

generating a trained ML model based on using the spatial data as a training input for an ML model; and deploying the trained ML model within the cloud platform for detecting tenants associated with malicious activity.

2. The method of claim 1, wherein the first timescale is hours and the second timescale is days.

3. The method of claim 1, wherein the first type of activity and the second type of activity are each a type of activity selected from a group consisting of user creation, user deletion, service principal creation, service principal deletion, group creation, group deletion, and group modification.

4. The method of claim 1, wherein the first multi-dimensional representation of the first set of time-sequential data points is an image comprising a plurality of pixels.

5. The method of claim 4, wherein a value of each pixel in the plurality of pixels represents an aggregate number of occurrences of the first type of activity over a period of time corresponding to an intersection of the first dimension and the second dimension at the pixel.

6. The method of claim 5, wherein the value of each pixel represents the aggregate number of occurrences of the first type of activity over the period of time as a scaled value between zero and 255.

7. The method of claim 5, wherein each period of time is one hour.

8. The method of claim 5, wherein generating the trained ML model comprises generating a trained convolutional neural network (CNN) model.

9. The method of claim 8, wherein using the spatial data as the training input for the ML model comprises using the image as the training input for the ML model.

10. The method of claim 8, wherein:

the image is a first image comprising a first plurality of pixels;

converting the sequential activity data into spatial data also includes generating a second multi-dimensional representation of a second set of time-sequential data points corresponding to a second type of activity within the tenant, wherein the second multi-dimensional representation of the second set of time-sequential data points is a second image comprising a second plurality of pixels; and using the spatial data as the training input for the ML model comprises using the first image and the second image as the training input for the ML model, including using the first image as a first image channel and using the second image as a second image channel.

11. A method implemented in a computer system that includes a processor system, for detecting malicious tenants based on spatialized activity data, comprising:

accessing sequential activity data for a tenant within a cloud platform, the sequential activity data comprising:

a first set of time-sequential data points corresponding to a first type of activity within the tenant; and a second set of time-sequential data points corresponding to a second type of activity within the tenant;

converting the sequential activity data into spatial data, including;

generating a first multi-dimensional representation of the first set of time-sequential data points, wherein the first multi-dimensional representation expresses the first set of time-sequential data points within at least a first dimension representing a first timescale and a second dimension representing a second timescale; and generating a second multi-dimensional representation of the second set of time-sequential data points, wherein the second multi-dimensional representation expresses the second set of time-sequential data points within at least the first dimension and the second dimension;

inputting the spatial data to a trained machine learning (ML) model; and initiating a remedial action against the tenant based on the trained ML model outputting an indication that activity data for the tenant has a threshold probability of being malicious.

12. The method of claim 11, wherein the first timescale is hours and the second timescale is days.

13. The method of claim 11, wherein the remedial action is an action selected from a group consisting of disabling the tenant, deleting the tenant, initiating a message to a contact associated with the tenant, and blocking network activity by a service within the tenant.

14. The method of claim 11, wherein the trained ML model is a trained convolutional neural network (CNN) model.

15. The method of claim 11, wherein the first multi-dimensional representation of the first set of time-sequential data points is an image comprising a plurality of pixels.

16. The method of claim 15, wherein a value of each pixel in the plurality of pixels represents an aggregate number of occurrences of the first type of activity over a period of time corresponding to an intersection of the first dimension and the second dimension at the pixel.

17. The method of claim 16, wherein the value of each pixel represents the aggregate number of occurrences of the first type of activity over the period of time as a scaled value between a minimum pixel value and a maximum pixel value.

18. A computer system comprising:

a processor system; and a computer storage medium that stores computer-executable instructions that are executable by the processor system to at least:

access sequential activity data for a tenant within a cloud platform, the sequential activity data comprising:

a first set of time-sequential data points corresponding to a first type of activity within the tenant; and a second set of time-sequential data points corresponding to a second type of activity within the tenant;

convert the sequential activity data into spatial data, including:

generating a first multi-dimensional representation of the first set of time-sequential data points, wherein the first multi-dimensional representation expresses the first set of time-sequential data points within at least a first dimension representing a first timescale and a second dimension representing a second timescale; and generating a second multi-dimensional representation of the second set of time-sequential data points, wherein the second multi-dimensional representation expresses the second set of time-sequential data points within at least the first dimension and the second dimension;

input the spatial data to a trained machine learning (ML) model; and initiate a remedial action against the tenant based on the trained ML model outputting an indication that activity data for the tenant has a threshold probability of being malicious.

19. The computer system of claim 18, wherein the first timescale is hours and the second timescale is days.

20. The computer system of claim 18, wherein the first multi-dimensional representation of the first set of time-sequential data points is an image comprising a plurality of pixels.

* * * * *